United States Patent [19]

Kim

[11] Patent Number: 5,096,725

[45] Date of Patent: Mar. 17, 1992

[54] AUTOMATIC COOKING METHOD

[76] Inventor: Kyung H. Kim, 41-4, Songpa-dong, Songpa-ku, Seoul, Rep. of Korea

[21] Appl. No.: 460,270

[22] Filed: Jan. 2, 1990

[30] Foreign Application Priority Data

Jan. 11, 1989 [KR] Rep. of Korea .................. 89-234
Jan. 21, 1989 [KR] Rep. of Korea .................. 89-666

[51] Int. Cl.$^5$ ........................ A23L 1/00; G05D 23/00
[52] U.S. Cl. ...................................... 426/233; 426/509; 426/523
[58] Field of Search ................ 426/231, 233, 523, 509

[56] References Cited

U.S. PATENT DOCUMENTS 3,065,078 11/1962 Minami ........................... 426/233

Primary Examiner—George Yeung
Attorney, Agent, or Firm—Anthony J. Casella; Gerald E. Hespos

[57] ABSTRACT

This invention relates to an automatic cooking method and apparatus employing an indirect heating system, which is controlled with the help of temperature detection sensors and a time delay circuit setting a cooking time for control of the heating unit. The proper time and temperature for preparation are found from tests made in advance by recipes, cooking characteristics, sizes of solid ingredients, and by a user's option.

8 Claims, 1 Drawing Sheet

AUTOMATIC COOKING METHOD

BRIEF SUMMARY OF THE INVENTION

The present invention relates to an automatic cooking method and apparatus employing an indirect heating system that, upon setting a recipe with designation of a nature of cooking e.g. boiling roasting or steaming, automatically executes the heating operation for preparation of the recipe.

In the conventional art, some automatic cooking apparatuses have been known to include an electronic circuit system that, on setting a recipe with an amount of foods for a number of plates to be served, calculates cooking time from the data obtained in advance through experiments of foods and amounts and carries out the preparation of the recipe in automation with a timer function.

However, in practical use, such apparatuses are known to often result in incorrect operations. For example, since people take food in an amount different from one another, it is very difficult to determine the proper amount of foods for preparation when a number of plates are to be served.

Also, according to another device of the known art, a gas range is arranged to have a heat sensor in contact with the outer side of the cooking vessel for sensing the temperature of the foods in cooking so as to stop the heating operation automatically when the temperature sensed reaches a certain degree set by the user. However, the method for attaching the sensor closely in contact with the bottom of the vessel to obtain the correct temperature of the contents in cooking in the vessel requires in practical application some difficult conditions to meet with a particular construction, shape and material.

In the above system the outer surface temperature of the cooking vessel indirectly represents the temperature of the liquid content largely in contact with the inner surface of the vessel, and in an indirect heating system the temperature of a liquid content rises faster than the temperature of solid ingredients in the liquid in cooking. Therefore, a system for controlling the cooking operation based on the outer face temperature of the cooking vessel is likely to stop the heating of the solids in the liquid before they are sufficiently heated, thus presenting a difficulty in preparing recipes including solid ingredients in liquid.

To overcome such difficulty, the present applicant filed a prior application for a device that places a sensor in the food in cooking. The device however has an inconvenience of placing a sensor in the food in cooking each time a cooking is made.

The present invention is designed to eliminate the disadvantages of the conventional apparatuses for cooking and to provide a correct cooking operation even for sufficiently heating solid ingredients in liquids in preparation. The invention may be used with any of the known heating devices for indirectly heating foods with the use of gas, oil or electricity.

DETAILED DESCRIPTION

Figure 1:
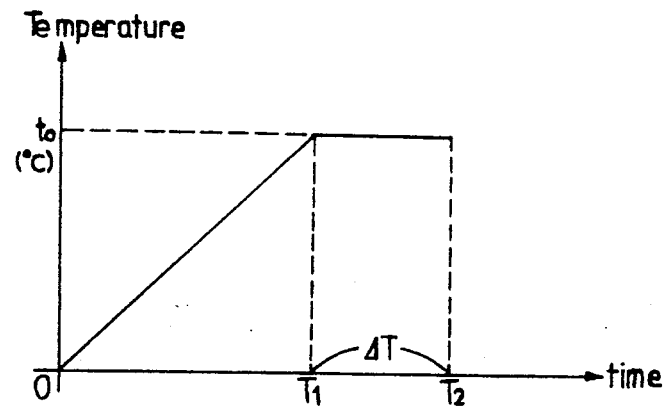
FIG. 1 shows a graph of temperature change of a recipe including a liquid ingredient in cooking according to the invention.

The invention shall be described in detail with reference to the drawings. Referring to FIG. 1, the graph shows the temperature change from the start to the end of heating a food preparation including solid ingredients in liquid. The indirect heating of the food brings a rise in temperature first to the liquid before it does to the solids and then maintains the temperature rise to the boiling point to degree C., at which points the temperature levels off and is maintained for a time $\Delta T$ for properly cooking the solids in the boiling liquid before turning off the heating.

The present invention is designed to make use of the fact that the duration of boiling the liquid of a recipe for the proper cooking of solids in the liquid is not influenced by the amount of the solids as far as the solids are the same in kind and size for the recipe.

The heating sustained at the boiling temperature to degree C. is accompanied with the following phenomenons.

Firstly, the boiling temperature is reached and maintained for a certain time before turning off the heating.

Secondly, the continued heating does not increase the temperature of the liquid any more than the boiling point (although in practice the boiling temperature slightly increases as the liquid thickens in boiling). That is, no more rise in temperature occurs unless the liquid dries up in evaporation.

Thirdly, turbulence occurs accompanied with violent noises and vibrations.

The above three phenomenons appear distinctly from the time T1 in FIG. 1. In the process of heating from the start to the boiling point, solid ingredients in liquid for preparation undergoes a slow cooking.

However, according to some recipes, most of the solids in liquid for preparation is often undercooked in the course of heating up to the boiling temperature at time T1 such that the boiling has to be sustained for $\Delta T$ time as in FIG. 1 for sufficient cooking. The time $\Delta T$ for sustained boiling may differ with the kind, size and cooking nature of solids of a recipe. Therefore, the time data for sustained boiling may be prepared by recipes from measurements of advance experiments. For example, for preparation of a recipe, tests are performed to find how long a boiling should be continued further after reaching the boiling point in temperature to sufficiently cook solids in the boiling liquid and obtain tastiness of the food for completion of the preparation, and the information found is applied to the automation of the cooking process.

Also, by preference a food in preparation may be well done or half done by an exterior means for control of the boiling time T in FIG. 1 within a small range of adjustment. However, the sustained boiling time $\Delta T$, which is determined through tests, has a different starting time for boiling for each recipe since the time for reaching to the boiling temperature from the start of heating varies with the kind of ingredients in a recipe for preparation and also because the density of the liquid under heating thickens with the proceeding of the preparation to raise the boiling temperature slightly.

The present invention is designed to fine the "point of time for reaching the boiling point" by sensing the "three phenomenons" in boiling described above.

The point of time coming to the boil is determined by sensing the turbulence of the boiling food contents under preparation or the leveling-off of the temperature rise to maintain the boiling for a time $\Delta T$, which is determined through tests and varies with the recipe and its cooking nature. The heating is turned off or reduced upon the termination of the boiling time to complete the preparation. In the system of sensing a change in the pace of temperature rise, one of the three phenomenons, a temperature sensor attached in contact with the cooking vessel, or a radiation temperature sensor for non-contact temperature measurement, is made to sense the state of temperature variation of the vessel to represent the temperature variation of the liquid in the vessel instead of the actual temperature measurements, making it possible to detect the boiling in the vessel.

Thus, the detection of temperature variation in the cooking vessel is possible without the necessity for the temperature sensor to be in close contact or without the need for the cooking vessel to have a good conductivity of heat, and even an infrared temperature sensor may be employed to detect the change in temperature from a remote position and conclude a boiling in the vessel.

As shown in FIG. 1, with the temperature of the liquid content reaching to the boiling point, the heat energy further supplied from a heater all turns into evaporation heat and does not cause a rise in temperature for the liquid in the cooking vessel but rather causes a leveling off the boiling temperature, which is then detected to indicate the start of boiling in the liquid under preparation.

For the convenience in practical application, the temperature variation of the liquid in the cooking vessel may be indirectly detected through the outer face of the vessel instead of directly measuring the temperature of the liquid in the vessel to find the boiling state from the leveling-off of the temperature rise in the vessel.

In another detection system, the turbulence of noises and vibrations of the food contents in the vessel is sensed to find the boiling state in the vessel. This system does not require a sensor in close contact with the cooking vessel or a good conductivity of heat for the material of the vessel to find a turbulence and determine the state of boiling in the vessel to an advantage. Further, in detecting the turbulence, noise may be detected through a noise sensor disposed in non-contact with the cooking vessel, or vibration is sensed through a support member for the vessel without a separate sensor. Also, the state of "boiling" may be found from the detection of variation in vibration and noise strength instead of detecting the actual strength of vibration and noise in the vessel.

As described above, a proper detection method for finding the state of boiling may be selected based on the type of heater, construction of the cooking apparatus, characteristics of recipe and construction cost from the above stated three detection systems.

The construction and operation of the invention shall be described in reference to preferred embodiments.

EMBODIMENT 1

This embodiment shows a construction of the invention having an indirect heating device, such as a gas heater, electric resistance heater or an electromagnetic induction heater, and being equiped with a detection system for sensing turbulence (of vibration and noise) and maintaining a boiling time (for $\Delta T$) of food contents in a cooking vessel to complete an automatic preparation of a recipe.

Figure 2:
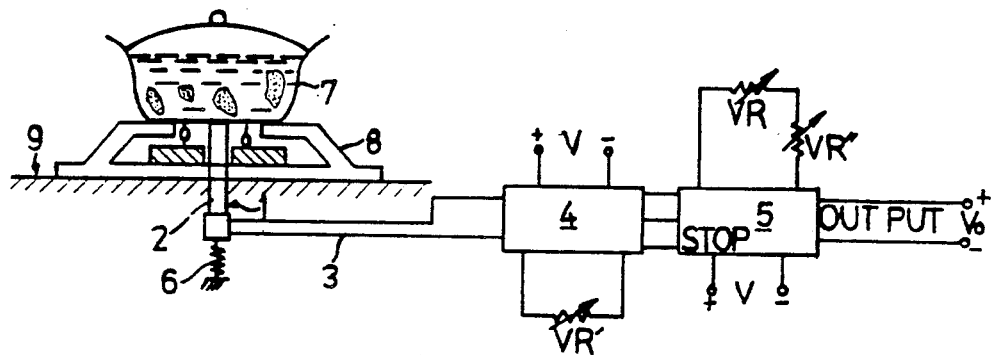
FIG. 2 is a schematic block diagram including a circuit for sensing turbulence in food contents in cooking according to the invention.

Referring to FIG. 2, a separate turbulence sensor 1 is disposed, biased by a spring 6, in contact with the outer face of a cooking vessel 7 in the center of the heating system. The sensor 1 houses a turbulence sensor element 2 (for sensing vibration and noise) connecting through a lead line 3 with a turbulence detection circuit 4 including a filter circuit and an excess heat determination logic circuit, the circuit 4 further connecting to a time delay circuit 5 adjustable for time delay.

In the construction in FIG. 2, upon coming to the boiling temperature, the food content in the cooking vessel enters into the state of "turbulence" (of vibration and noise) that is sensed by the sensor 2 and given as input to the turbulence detection circuit 4, which in turn checks the frequency, strength and duration of the input signal for a signal for true turbulence and gives an output signal for any true turbulence to the time delay circuit 5 having a "stop" function acting on an input signal for excess heating. The circuit 5 upon receiving the signal for turbulence delays time for a period set in advance in selection from the information in relation to recipes, cooking characteristics and solid sizes to give an output voltage ($V_0$) for interrupting or reducing the heating before automatic completion of a preparation. With a gas heater, a gas tube valve is operated by a known means acting on an output of electric voltage for control of gas supply, whereas an electric heater is controlled by a known means using electric voltage output.

Referring to FIG. 2, the resistance for setting a delay time may be set through a variable resistor VR or set in advance at a resistance value determined through tests by the kind of recipe to switch the value to the delay circuit 5. In the case of employing a known microprocessor the time delay selected according to the characteristics of a recipe may be set by a known means such as pushing a switch button for a number of times or for a period of time or pushing a designated button to give the final output signal upon termination of the delay time and possibly generate an alarm sound for completion of the preparation.

The frequency characteristics, strength and duration of input signals are checked for verification of a signal for true turbulence in boiling by means of a known analog circuit or a known microprocessor program.

As shown in FIG. 2, the state of turbulence in the cooking vessel is delivered not only to the sensor 1 but also to the tripod support for the cooking vessel such that the sensor 1 or the sensor element 2 may be arranged to be in contact with any portion of the tripod 8 for the vessel 7. The sensor may also be attached to the main body 9 supporting the tripod 8 in the cooking apparatus. Besides, in the case of employing a sound sensor the noise of turbulence transferred through air may be sensed by a sensor disposed in separation from the cooking vessel and its tripod support in a non-contacting manner. The concentration of the signal sound is made by means of a known art.

The safety function by a logic circuit included in the turbulence detection circuit shall be described in reference to FIG. 2. The known logic circuit incorporated in the turbulence detection circuit on its output side detects an interruption or weakening of the turbulence signal, which has been maintained for more than a predetermined time after being detected by a sensor, to immediately give a signal to the "stop" terminal of the time delay circuit in FIG. 2 and interrupt the operation of the time delay circuit 5, which is reset to the original state and generates a voltage at its output for controlling the heater to interrupt the heating operation.

Thus, when an operator makes an erronous setting of the time delay and consequently results in heating the food for an excessive time period to dry up the liquid in the food and subsequently stop the boiling turbulence of the liquid, the interruption of the boiling is then detected by the safety function to stop the heating and prevent the food from overcooking or burning. This safety system may also be applied to an automatic rice cooking.

In cooking rice, water is first heated to boil with the rice, and then evaporates, for the remaining water to be absorbed into solid rice and stops the turbulent boiling because of the drying up of water. The interruption of turbulence is detected by the above logic circuit and by the "stop function" of the time delay circuit to adjust heating to the state of steaming rice for completion of the rice cooking. However, the main purpose of the safety function is the prevention of excessive heating, but in use with a pressure cooker it immediately stops the heating, while in use with an ordinary cooker it reduces the heating to adjust to a standing state of steaming rice.

Further, in cooking with a pressure cooker the jetting noise of steam may be used to find the boiling state of rice.

As described above, the present invention detects the state of turbulence which occurs with the boil of the food content including liquid and from the detection of the turbulence continues heating at the turbulent state for a time set in selection according to the characteristics of the recipe, its cooking nature and the condition of the solids of the recipe and to the taste of the operator to control and adjust the heating for automatic preparation. The invention of the embodiment prevents an erroneous operation with the use of the frequency characteristics, strength and duration of the signal on turbulence and also prevents an excessive heating with the use of a logic circuit for a safe operation to make possible the automation of food preparation without limitation to the shape and material of the cooking vessel.

EMBODIMENT 2

This embodiment employs a known device for indirect heating and a detection system that senses the pace of temperature rise of the food in cooking or the pace of temperature rise of the cooking vessel to find the state of boiling from the leveling-off of the rising temperature and maintain the state of boiling for a "Sustained boil times $\Delta T$" for the automation of food cooking.

Figure 3:
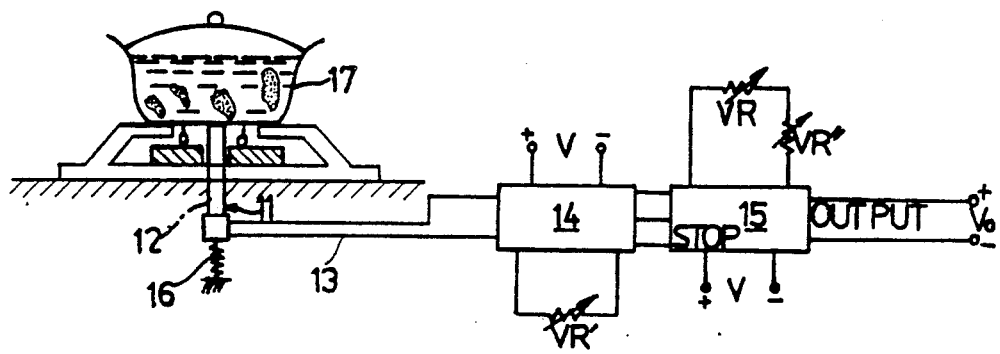
FIG. 3 is a schematic block diagram including a circuit for temperature control according to the invention.

According to the construction of the embodiment shown in FIG. 3, a temperature sensor bar 11 housing a temperature sensor element 12 is disposed on a heater to be biased in contact with the outer face of a cooking vessel 17 by means of a spring 16, or an infrared temperature sensor is mounted on a position of enabling to sense the temperature of the cooking vessel. For sensing the pace of the temperature rise in the cooking food, the sensor element 12 is stuck directly into the food contents in the cooking vessel and is connected through a lead wire with a temperature variation detection circuit 14 having at its output section a logic circuit for prevention of excessive heating, the detection circuit 14 connecting to a time delay circuit 15 which can set a delay time and has a function for immediately giving an output upon an input of the signal "stop" and resetting the circuit.

The present embodiment employing a commonly known control system with the use of the output voltage from the time delay circuit operates a control valve for a gas supply line (not shown in the drawing) or is arranged to control the electric heater in an electric heating apparatus, and it finds the point of time for the start of a temperature leveling-off as the point of time for the start of "boiling" and there on maintains the boiling temperature for a sustained boiling time $\Delta T$ predetermined through tests according to the kind of recipes, cooking nature and sizes of solids and to tastes of the operator to automatically complete the preparation upon termination of the sustained time.

Referring to the temperature sensor element attached in contact with a cooking vessel in FIG. 3, the resistance value of the sensor element continuously changes with the temperature rise of the food in cooking to reach the boiling point of the food and show no further change of the resistance value of the element with the leveling-off of the temperature rise. The temperature variation detection circuit 14 then gives a signal to the time delay circuit which in turn gives an output voltage after delaying a sustained boiling time $\Delta T$ selected from test results.by the recipe, cooking nature and solid food size and set in advance for the recipe, the output voltage actuating the control valve in a gas supply line or controlling an electric heater by means of a known art for completion of the preparation of the recipe.

For the safety function (excessive heating prevention function) in the present embodiment, the temperature variation detection circuit 14 having a known logic circuit in the output section detects the leveling-off of the temperature rise to keep the leveled state but when a sudden rise occurs above a certain point during the leveled period, an immediate signal for the rise is given to the "stop" terminal of the time delay circuit 15, which upon input of the signal immediately gives on output voltage to the output section to control the heating member and resets the original state.

Thus, when an erroneous setting of a sustained boiling time $\Delta T$ brings an overheating to the cooking food for an excessive time to dry up the liquid in evaporation and make a sudden rise in temperature in the cooking vessel, the temperature rise is detected to immediately interrupt heating for prevention of excessive heating and for the performance of an automatic cooking operation.

In a usual rice cooking, when water dries up in evaporation after a sustained boiling, the heating is controlled to be interrupted or weakened for steaming the rice in cooking to complete a cooking. However, the control of the heating is performed on detection of a sudden rise in temperature in the cooking vessel being dried of water, the detection of a temperature rise making the logic circuit immediately interrupt or weaken the heating for steaming the rice for an automatic cooking.

As in the embodiment 1, the present embodiment may also employ a microprocessor for the operation of detecting temperature variation, preventing excessive heating, logically finding a temperature change for cooking, maintaining a sustained boiling time $\Delta T$ based on the memory of recipes, cooking natures, solid food sizes and operator's preferred tastes, and controlling the heating member.

In the embodiment 2 of the above construction, the contact state between the cooking vessel and the temperature sensor may not need to be so close, and the cooking vessel may not be made of a metal having a good conductivity of heat. Besides, an infrared temperature sensor may be used for remote sensing of temperature. Such the remote temperature sensor (infrared sensor) may be employed for an indirect heating system, but it shall be installed in a manner of not receiving the radiation heat directly from the heating member. The embodiment also may stick the sensor directly into the cooking food to detect the temperature change in the food within the vessel.

As shown in the above embodiments 1 and 2, the present invention in application to the cooking of a food including liquid detects the "phenomenons in boiling", such as variation in temperature, and turbulence (of noise and vibration), to find the "state of boiling" and there on maintain, the heating at the boiling state for a sustained boiling time $\Delta T$, which is selected from test results by recipes, cooking natures, solid food sizes and operator's tastes and set in advance for the recipe with a cooking nature (heating, cooking or boiling) designated, to adjust the heating under control for automatic completion of the preparation of the recipe.

Also, according to the embodiments 1 and 2, the time delay circuit (or a time delay program for a microprocessor) gives an output voltage to its output section and simultaneously resets the circuit (or the program) to the original state, the output voltage driving a known alarm device. When a temperature rise occurs above a limited temperature in the preparation, the circuit upon input of the command signal "stop" immediately generates an output voltage to reset the circuit.

In the case of simply reheating a prepared food, the setting of the "sustained boiling time $\Delta T$" at "zero" shall suffice.

In the drawings the code VR indicates a variable resistor for adjusting the detection sensor.

Besides, in the embodiments, a logic circuit function (or an excessive heating prevention function) may be used to prevent excessive heating as well as to cook rice. When water dries up in evaporation in the course of cooking rice, the heating is also interrupted by the function.

However, since the nature of the course of cooking rice is almost the same as in the course of cooking a "hard boiled food", the logic circuit function of the present invention may also be applied to the cooking of the hard boiled food, in addition to the above functions.

Further, the temperature sensor housing a sensor element may be stuck into the food content within the cooking vessel instead of being attached to the outer face of the vessel for the same effect as with the embodiment 1.

In the above embodiment 2, the art of controlling heating when a food is to end its preparation with the liquid dried up, as in the case of rice cooking, and when the food comes to a certain degree of temperature is already well known. However, the present invention combines the known art such that the "sustained boiling time $\Delta T$", is intentionally set a little longer than the actual boiling time for automatic preparation of a food for ending up without liquid in preparation and thus is arranged to detect a temperature rise occurring in the course of executing the "boiling time $\Delta T$" and control the heating member. The arrangement also provides a safety function by controlling the heating after the termination of the limited "sustained boiling time $\Delta T$" even when the temperature sensor fails to detect a rise.

EMBODIMENT 3

This embodiment is similar to the embodiment 2 and is arranged to find the state of boiling from the temperature value of the outer face of an actual cooking vessel instead of finding from the detection of temperature variation and then maintains the temperature for preparation at the near boiling state for a sustained boiling time as in the embodiment 2. Although the embodiment 3 has the inconvenience of requiring a flat bottom for attaching a sensor, its construction of simple circuits brings an advantage of a low production cost. The only difference from the construction of the embodiment 2 is that the embodiment 3 is combined with a detective sensor for temperature values and a time delay timer circuit. This embodiment measures the boiling points by recipes from tests and records the preparation temperature of each recipe at a slightly lower temperature than the actually measured boiling point. It also prepares the information data for "sustained boiling times $\Delta T$" by recipes, as in the embodiment 2, to set a temperature detection circuit and a time delay timer circuit respectively for a preparation temperature and a "sustained boiling time $\Delta T$" for a recipe. In the case of employing a microprocessor the data of preparation temperatures and sustained boiling times by recipes are stored in a memory to be used later for setting for a recipe in selection, to the same effect as in the embodiment 2.

In the case of recipes having a boiling temperature similar to one another, the lowest temperature among them shall be employed for a common use as the preparation temperature of the recipes.

I claim:

1. A method using an indirect heating apparatus and electrical time delay apparatus for automatically cooking a mixture of solid material and liquid, said method comprising the steps of:
    inputting information to the time delay apparatus for indicating a desired sustained boiling time for boiling the mixture;
    heating the mixture using the indirect heating apparatus;
    sensing at least one characteristic indicative of end onset of boiling of the liquid in the mixture;
    generating a signal indicating the sensed onset of boiling;
    actuating the electrical time delay apparatus in response to the signal indicating the onset of boiling for measuring elapsed time from the onset of boiling;
    generating a signal for automatically terminating the heating when the measured elapsed time from the onset of boiling equals the desired sustained boiling time for boiling the mixture.

2. A method as in claim 1 wherein the step of sensing at least one characteristic indicative of an onset of boiling of the liquid in the mixture comprises inputting to the time delay apparatus a known boiling temperature for the liquid in the mixture, measuring the actual temperature of the liquid in the mixture and comparing the actual temperature to the inputted known boiling temperature of the liquid to sense the onset of boiling of the liquid in the mixture.

3. A method as in claim 1 wherein the step of sensing at least one characteristic indicative of an onset of boiling of the liquid in the mixture comprises sensing increases of temperature of the liquid of the mixture and identifying a termination of increases of temperature of the liquid to indicate an onset of boiling of the liquid in the mixture.

4. A method as in claim 3 wherein the mixture is heated in a container, and wherein the step of measuring increases in the temperature of the liquid comprises measuring increases of temperature of the container in which the mixture is heated.

5. A method as in claim 1 wherein the step of sensing at least one characteristic indicative of an onset of boiling of the liquid in the mixture comprises the step of measuring vibrations indicative of an onset of boiling.

6. A method as in claim 1 wherein the step of sensing at least one characteristic indicative of an onset of boiling in the liquid in the mixture comprises measuring noise indicative of an onset of boiling of the liquid.

7. A method as in claim 1 further comprising the steps of measuring temperature after the onset of boiling and generating a signal to terminate heating in response to a measured increase in temperature after the onset of boiling as an indication of evaporation of the liquids in the mixture, and thereby preventing an overcooking of the solids in the mixture.

8. A method as in claim 1 wherein the electrical time delay apparatus comprises a microprocessor with means for storing sustained boiling times for each of a plurality of different mixtures, and wherein the step of inputting information indicating a desired sustained boiling time comprises identifying a particular mixture to be cooked from the plurality of mixtures for which sustained boiling times are stored in the microprocessor.

* * * * *